June 10, 1958 J. R. HORSCH 2,838,669

COUNTING NETWORK

Filed Feb. 28, 1957

INVENTOR:
JAMES R. HORSCH,
BY Robert J. Steinmeyer
HIS ATTORNEY.

United States Patent Office 2,838,669

Patented June 10, 1958

2,838,669

COUNTING NETWORK

James R. Horsch, Elmhurst, Ill., assignor to General Electric Company, a corporation of New York Application February 28, 1957, Serial No. 643,113

9 Claims. (Cl. 250—27)

Figure 1:
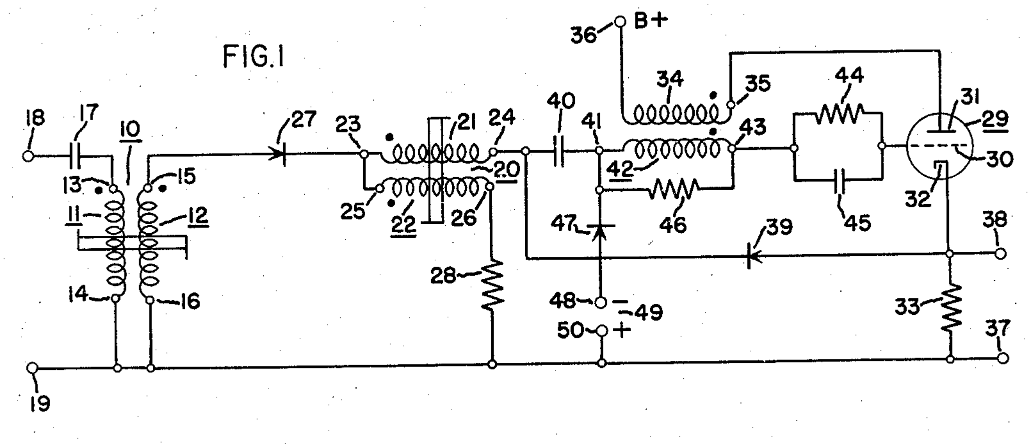

My invention comprises a blocking oscillator counting network and, more particularly, a counting network utilizing the characteristics of saturable core magnetic transformers at least for performing the functions of stabilizing the energy of input pulses and step counting of such stabilized pulses.

In the prior art it is known to use a saturable magnetic core having a rectangular hysteresis loop for step counting. One difficulty in accomplishing this purpose has been in obtaining a uniform volt-second area input pulse to be counted. Another difficulty has been that, in transferring signals from the counting circuit to a blocking oscillator output circuit in order to transfer the signal to a succeeding counter stage, noise pulses have been obtained from the counting core which may cause detrimental triggering of the blocking oscillator.

Another problem encountered in the blocking oscillator itself is the turning on and cutting off of the oscillator. This has usually been done by building up a charge on a capacitor in the grid circuit to cut the tube off, which then decays to cause the tube to trigger. This charge decays exponentially and so has a low slope near the triggering point which causes instability in the triggering of the oscillator. Accordingly, it is an object of my invention to provide a fast acting, positive switching, blocking oscillator counter stage coupling a minimum number of components.

Another object of my invention is to provide an improved blocking oscillator counter utilizing saturable magnetic cores having rectangular hysteresis loops.

Still another object of my invention is to provide a blocking oscillator counter employing a saturable core with a rectangular hysteresis loop to derive uniform volt-second area pulses from non-uniform input pulses.

A further object of my invention is to cancel the noise effects at the oscillator grid due to the coercive current in a magnetic counting component of a blocking oscillator counter circuit.

A still further object of my invention is to provide saturable grid-plate coupling means in the blocking oscillator circuit in order to obtain a more positive cut-off thereof.

A more specific object of my invention is to provide a blocking oscillator counter employing a single saturable core and electron tube or transistor per stage, wherein the single saturable core has windings wound thereon to perform all the functions mentioned above.

In carrying out my invention in one form thereof, I provide a blocking oscillator counter stage employing a single tube or transistor and a saturable core transformer to provide the beforementioned functions. The transformer has a plate winding, a grid winding, a counting winding and an output winding wound thereon. An oscillator tube is also provided having at least a grid, a plate and a cathode. The plate winding is connected from the plate to a source of potential. The grid winding is connected through a resistor from the grid and to one terminal of a source of input pulses through a first diode. The source of pulses may be the output winding of a previous stage. The other terminal of the source of pulses is connected to one terminal of the counting winding through a resistor. The other terminal of the counting winding is connected to the terminal of the grid winding remote from the grid. A biasing circuit is provided by connecting a second diode across the source of input pulses and the first diode, poled to pass current from the grid. The tube cathode is connected to a common point and the bias potential is applied with its positive terminal connected to the common point and its negative terminal connected to the other terminal of the source of pulses. When the core of the previous stage is reset the first diode is poled to pass a pulse to the counting winding. This pulse does not appear across the grid winding since the turns ratio of the counting and grid windings and their polarity, as well as the resistor in series with the counting winding, are selected so that the voltage induced in the grid winding from the counting winding is cancelled by that coming from the source of input pulses. When a sufficient number of pulses have been counted by the counting winding to cause the core to shift from one direction of saturation to the other, the core saturates passing the next pulse to the grid and triggering the oscillator. The plate and grid windings then cause regeneration in the tube and the current in the plate winding also resets the core. This in turn causes an output pulse to be transmitted to the output winding which may also have a diode in series with it to allow current to flow therein only during resetting.

The novel features which I believe to be characteristic of my invention are set forth with particularity in the appended claims. My invention itself however, together with further objects and advantages thereof, can best be understood by reference to the following description taken in connection with the accompanying drawings, in which Fig. 1 is an illustration of one embodiment of my invention and Fig. 2 is an illustration of a second embodiment of my invention employing a single saturable core per stage.

Figure 2:
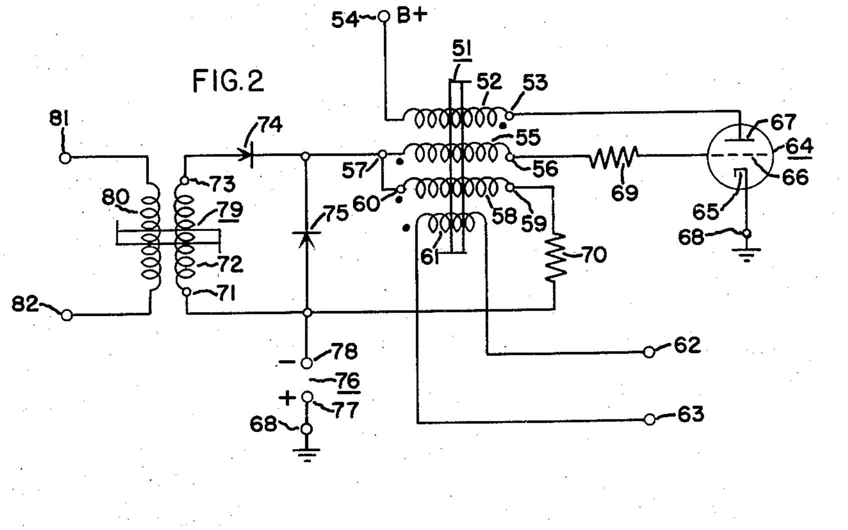

Referring specifically now to the embodiment of Fig. 1, I have illustrated a single stage of a blocking oscillator counter circuit. The first component of the stage comprises a saturable core 10 having an input winding 11 and an output winding 12 wound thereon. Input winding 11 has terminals 13 and 14 and output winding 12 has terminals 15 and 16 respectively. A capacitor 17 is connected to terminal 13 in series with the input winding 11 across a pair of input terminals 18 and 19 which are adapted for connection to a source of input pulses to be counted, the other side of the capacitor being connected to terminal 18 and input terminal 19 being connected to winding terminal 14.

The second component of the stage comprises a second saturable core 20 having two windings 21 and 22 wound thereon. Winding 21 has terminals 23 and 24 and winding 22 has terminals 25 and 26 respectively. Terminal 23 of the winding 21 is connected through a semiconductor diode 27 to terminal 15 of winding 12. The terminal 23 of winding 21 is also connected to terminal 25 of the winding 22. Terminal 26 of winding 22 is connected through a resistor 28 to the terminal 16 of winding 12 which is in turn connected to input terminal 19.

The third component of the stage is a blocking oscillator employing a high vacuum electron tube 29 having a grid 30, a plate 31 and a cathode 32. The cathode 32 is connected through a resistor 33 to input terminal 19 and the plate 31 is connected through a plate winding 34, which has a terminal 35 connected to plate 31 and a terminal 36 connected to a source of positive potential B+. A pair of output terminals 37 and 38 are connected across resistor 33, output terminal 37 being connected to input terminal 19 and output terminal 38 being connected to cathode 32. A resetting diode 39 is connected between cathode 32 and terminal 24 of winding 21. Terminal 24 of winding 21 is in turn connected through a capacitor 40 to a terminal 41 of a grid winding 42 that has a second terminal 43 from which the parallel combination of a resistor 44 and a capacitor 45 is connected to grid 30. A resistor 46 is connected across terminals 41 and 43 and a diode 47 is connected from terminal 41 to a negative terminal 48 of a source of D. C. bias 49, a positive terminal 50 of which is connected to input terminal 19.

The operation of the circuit of Fig. 1 is as follows. The saturable core 10 is a device for deriving uniform volt-second area output pulses when non-uniform input pulses to be counted are applied across the input terminals 18 and 19. In order for core 10 to function in this fashion, however, the pulses applied across terminals 18 and 19 must be of sufficient magnitude to drive the core 10 from one direction of saturation to the other. The pulses are supplied to winding 11 and during the time the core is not in saturation a pulse is transferred to the winding 12. The polarities of windings 11, 12 and the pulse are such that this pulse is blocked by diode 27. Also during this time the capacitor 17 is charged by the remainder of the input pulse after core 10 has saturated. After termination of the input pulse the charge stored in the capacitor 17 will cause a reverse current to flow in the winding 11 resetting core 10. This resetting pulse is transmitted to winding 12 and is passed by diode 27. The energy used to drive the core 10 from saturation in one direction to saturation in the other direction is always constant and thus the pulse appearing across winding 12 will always have a uniform volt-second area.

The semiconductor diode 27 is connected from the terminal 15 of winding 12 to the terminal 23 of windings 21 on the counting core 20 in order to isolate the input circuit from the blocking oscillator circuit. When a pulse appears across the winding 12 during resetting of core 10, it is passed by the diode 27 and flows through winding 22 and resistor 28 to terminal 19. The turns ratio between the winding 22 and the winding 21 and the polarity of these windings is selected so that, when coercive current flows in the winding 22, it induces a voltage in the winding 21 that is sufficient to cancel the voltage generated therein by the input pulse which appears across the winding 12 during the counting time when the core 20 is shifting states from saturation in one direction to saturation in the other direction. This provides cancellation of noise pulses in the grid circuit of the blocking oscillator 29 during the time the core 20 is counting pulses.

When the core 20 has counted a preselected number of pulses required to drive it from saturation in one direction to saturation in the other direction, it saturates and transmits the next pulse appearing across the winding 12 to the capacitor 40 and thence to the grid circuit of blocking oscillator 29 causing the grid 30 of oscillator 29 to go positive, to rise above cutoff, and to trigger the oscillator 29 into its firing state. The windings 34 and 42 are connected regeneratively in order to sustain oscillation. While the oscillator 29 is firing, a cathode pulse is conducted through diode 39, winding 21, winding 22 and resistor 28 to terminal 37 in order to reset core 20. The core 20 is reset because the number of turns on winding 21 is greater than the number of turns on winding 22 as a result of the previous requirement of establishing a sufficient induced voltage from winding 22 into winding 21 to cancel the effect of input pulses appearing across winding 12 during counting. Thus, since the number of ampere-turns due to winding 21 exceeds the number of ampere-turns due to winding 22 and though the windings are opposing when current is flowing through diode 39, the net effect is to reset core 20 in order to permit it to start the counting cycle over.

An output pulse appears across the resistor 33 at terminals 37 and 38 during the time that the blocking oscillator is firing. This output pulse may be transmitted to a succeeding stage which may again have terminals such as 18 and 19 for inputs.

In the blocking oscillator 29 the parallel resistor 44 and capacitor 45 in the grid circuit are used to damp out spurious oscillations. While the regenerative effect proceeds, the positive charge on capacitor 40 decays due to grid current in grid 30, and eventually the oscillator will cut off, preparing itself to fire again on application of the next input pulse from winding 21 when core 20 next saturates.

An additional bias connected through diode 47 to the grid circuit of grid 30 is provided from source of potential 49 in order to keep the oscillator 29 cut off in its normal state until core 20 saturates and passes a signal pulse.

Turning now to the embodiment of Fig. 2, I have illustrated a blocking oscillator counter stage which employs a single saturable core to perform all the functions performed by the saturable cores of the circuit of Fig. 1 and, in addition, to perform the function of de-coupling the grid-plate coupling circuit of the oscillator. In Fig. 2, I have shown a saturable core transformer 51 which has a rectangular hysteresis loop and a high degree of magnetic remanence. The core 51 has a plate winding 52 having terminals 53 and 54, a grid winding 55 having terminals 56 and 57, a counting winding 58 having terminals 59 and 60 and an output winding 61 having terminals 62 and 63.

An electron oscillator tube 64 having a cathode 65, a grid 66 and a plate 67 has its cathode 65 connected to a common point 68 which may be maintained at ground potential as indicated. The plate 67 is connected to terminal 53 of winding 52 and the terminal 54 of winding 52 is connected to a source of potential B+, the negative terminal of which is maintained at the potential of common point 68. Terminal 56 of winding 55 is connected through a resistor 69 to grid 66. Terminal 57 of winding 55 and terminal 60 of winding 58 are connected together, and terminal 59 of winding 58 is connected through a resistor 70 to a terminal 71 on the secondary winding 72 of an input transformer not specifically identified by a separate numeral on the drawing. The other terminal 73 of winding 72 is connected through a diode 74 to terminal 57 of winding 55, and a second diode 75 is connected from terminal 57 of winding 55 to terminal 71 of winding 72. Winding 72 may be the output winding of a previous stage much as the output winding 61 of the stage of Fig. 2 may be the input winding of a succeeding stage. An additional source of bias potential 76, having a positive terminal 77 and negative terminal 78, has its positive terminal 77 connected to common point 68 and its negative terminal 78 connected to terminal 71 of winding 72.

As previously stated winding 72 may be the output winding of a previous stage and I have shown it wound on a saturable core 79 which has an additional winding 80 wound thereon. Winding 80 has terminals 81 and 82. If the core 79 is considered to be the core of a previous stage similar to core 51 of the stage shown in Fig. 2, then winding 80, which serves as an input winding, compares to winding 52 which resets core 51 and transmits a signal to the next stage during resetting. Thus, winding 72 may be interchangeably called an input or an output winding and winding 80 may be termed an input or a plate winding.

In one practical embodiment of the circuit of Fig. 2 the following set of values for the components (including type identification for the diodes and tubes) was found to work satisfactorily:

Cores 51 and 79=20 wraps of one mil thick tape on ¼" ceramic bobbin ⅛" wide. Deltamax, 50% Ni, 50% Fe, available at Arnold Engineering, Marengo, Illinois
Windings 52 and 80=300 turns
Winding 55=200 turns
Winding 58=100 turns
Windings 61 and 72=45 turns
Resistor 69=1000–3000 ohms
Resistor 70=1000 ohms
B+=285 volts
Diodes 74 and 75=1N118
Source 76=30 volts
Tube 64=½ 12BH7

Turning now to the operation of the circuit of Fig. 2, it will be seen that many of the features of the operation of this circuit are similar to those of Fig. 1. However, the circuit itself is much simpler since many of these functions have been combined on the single transformer 51. Consequently, a single stage may be composed of a single transformer and tube with a few associated resistors and diodes. In addition, the circuit of Fig. 2 eliminates the necessity for the capacitors in the circuit of Fig. 1.

An input signal is received on the winding 72 from the previous stage during the time when the core 79 associated with the winding 72 is resetting as a result of plate current flowing in winding 80. The diode 74 is poled to pass this resetting pulse but will not pass any pulses generated in the transformer 79 of the preceding stage during the process of counting up the hysteresis loop in that stage. The resetting pulses are received by the winding 58 of the core 51 and are counted on core 51. While this counting is taking place a voltage is induced in the grid winding 55 from the counting winding 58, such voltage having a magnitude sufficient to cancel out the effect of the counting pulses from winding 72 in the winding 55. Thus, during counting, no coercive current flows through the winding 55 and reaches the grid 66 of the oscillator tube 64. Winding 72, the input winding, serves the purpose of providing a uniform volt-second area pulse to the counting winding 58 and, after the winding 58 has stepped the core 51 from one direction of saturation to the other, the coupling between windings 58 and 55 ceases. The next input pulse from the winding 72 is therefore passed by winding 55 which is now coupled to a saturated core and thus presents a low impedance to the pulse. The pulse appears across the resistor 69 driving grid 66 above its cutoff voltage and firing the oscillator tube 64.

Upon firing of the tube 64 the plate current regenerates from winding 52 to winding 55 which have the indicated polarities to produce regeneration, whereby tube 64 is caused to continue firing. During the time of regeneration the polarity of the winding 52 is such that the core 51 is driven back or reset from its state of saturation after counting to saturation in its initial state, preparing it for counting the next series of input pulses. Upon reaching the initial saturation condition, or reset position, the coupling between windings 52 and 55 abruptly ceases. This causes regeneration in the tube 64 to cease and the tube cuts off. During the period of resetting, output winding 61 generates a voltage which is transmitted to the next stage which also has a rectifier similar to rectifier 74 in its input circuitry to permit passage of only the resetting current. Again, the function of diode 75 is similar to that of diode 47 and the functioning of source 76 is similar to that of source 49 in Fig. 1, both serving to maintain the tube 64 in its cut-off position in its normal state of operation.

As will be apparent from the foregoing description of my invention, I have shown that the circuitry of my invention may be employed by placing all the windings on a single core, thus yielding a compact unit for a single stage of a blocking oscillator counter. Such a stage may be cascaded indefinitely and is ideally suited for application in circuits such as may be found in television synchronizing systems, as well as many other counter applications in which it is desired to employ a minimum number of components to achieve maximum simplicity of circuitry. It is obvious that the tube of the circuits of Figs. 1 and 2 may be replaced by a transistor without departing from my invention.

While I have shown particular embodiments of my invention it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. A blocking oscillator counter stage comprising a pair of input terminals for connection to a source of input pulses to be counted, means connected across said input terminals for deriving across a pair of output terminals a uniform volt-second area output pulse from each of said input pulses, a blocking oscillator including an electron tube having at least a grid, a plate and a cathode, said plate and grid having transformer windings regeneratively coupled therebetween, counting means including a winding on a saturable core connected between one of said output terminals and the grid circuit of said blocking oscillator, said core being composed of a substantially rectangular hysteresis loop material having high magnetic remanence, means connecting the other of said output terminals with the cathode circuit of said blocking oscillator, said uniform volt-second area output pulse having sufficient energy to drive said saturable core over a fixed increment of said hysteresis loop determined by the number of pulses to be counted per stage, whereby after application of said number of pulses said saturable core will saturate and trigger said oscillator, and means for resetting said saturable core after triggering said oscillator.

2. A blocking oscillator counter stage comprising a pair of input terminals for connection to a source of input pulses to be counted, means for deriving a uniform volt-second area output pulse from each of said input pulses including a first saturable core having an input and an output winding wound thereon, a capacitor connected in series with said input winding across said input terminals, said input pulses each having sufficient magnitude to drive said first saturable core from one direction of saturation to the other, said capacitor having sufficient capacitance to reset said first saturable core after termination of each of said input pulses, a blocking oscillator including an electron tube having at least a grid, a plate and a cathode, said plate and grid having transformer windings regeneratively coupled therebetween, counting means including a winding on a second saturable core connected between one terminal of said output winding and the grid circuit of said blocking oscillator, said second saturable core being composed of a substantially rectangular hysteresis loop material having high magnetic remanence, means connecting the other terminal of said output winding with the cathode circuit of said blocking oscillator, said uniform volt-second area output pulse having sufficient energy to drive said second saturable core over a fixed increment of said hysteresis loop determined by the number of pulses to be counted per stage, whereby after application of said number of pulses said second saturable core will saturate and trigger said oscillator, and means for resetting said saturable core after triggering said oscillator.

3. A blocking oscillator counter stage comprising a pair of input terminals for connection to a source of input pulses to be counted, means for deriving a uniform volt-second area output pulse from each of said input pulses including a first saturable core having an input and an output winding wound thereon, a capacitor connected in series with said input winding across said input terminals, each of said input pulses having sufficient magnitude to drive said first core from one direction of saturation to the other, said capacitor having sufficient capacitance to reset said first core after the termination of each of said input pulses, a blocking oscillator including an electron tube having at least a grid, a plate and a cathode, said plate and grid having transformer windings regeneratively coupled therebetween, counting means including a counting winding on a second saturable core of a substantially rectangular hysteresis loop material having high magnetic remanence, a diode connected in series with said counting winding between one terminal of said output winding and the grid circuit of said blocking oscillator, said diode being poled to pass current flowing away from said grid circuit during said resetting of said first core, means connecting the other output terminal of said output winding with the cathode circuit of said blocking oscillator, said uniform volt-second area output pulses having sufficient energy to drive said second saturable core over a fixed increment of said hysteresis loop determined by the number of pulses to be counted per stage, whereby after application of said number of pulses said second saturable core will saturate and trigger said oscillator, and means for resetting said second saturable core after triggering said oscillator.

4. A blocking oscillator counter stage comprising a pair of input terminals for connection to a source of input pulses to be counted, means for deriving a uniform volt-second area output pulse from each of said input pulses including a first saturable core having an input and an output winding wound thereon, a capacitor connected in series with said input winding across said input terminals, each of said input pulses having sufficient magnitude to drive said first saturable core from one direction of saturation to the other, said capacitor being large enough to reset said first core after termination of each of said input pulses, a blocking oscillator including an electron tube having at least a grid, a plate and a cathode, said plate and grid having transformer windings regeneratively coupled therebetween, counting means including a second saturable core of a substantially rectangular hysteresis loop material having high magnetic remanence, said second saturable core having two windings wound thereon, a diode connected in series with one of said two windings on said second saturable core between one terminal of said output winding and the grid circuit of said blocking oscillator, said diode being poled to pass current during resetting of said first core, a connection from a point between said diode and said one winding to one terminal of the other winding on said second saturable core, the other terminal of said other winding being connected through a resistor to the other terminal of said output winding, said windings on said second saturable core having a polarity and turns ratio such that flow of coercive current in said other winding will induce a voltage in said one winding sufficient to cancel the voltage therein due to said uniform output pulses during the time said second core is unsaturated, means connecting said other terminal of said output winding with the cathode circuit of said blocking oscillator, said uniform volt-second area output pulses having sufficient energy to drive said second saturable core over a fixed increment of said hysteresis loop determined by the number of pulses to be counted per stage whereby after application of said number of pulses said second saturable core will saturate and trigger said oscillator, and means for resetting said saturable core after triggering said oscillator.

5. A blocking oscillator counter stage comprising a pair of input terminals for connection to a source of input pulses to be counted, means for deriving a uniform volt-second area output pulse from each of said input pulses including a first saturable core having an input and an output winding wound thereon, a capacitor connected in series with said input winding across said input terminals, said input pulses each having a sufficient magnitude to drive said first saturable core from one direction of saturation to the other, said capacitor being large enough to reset said first core after termination of each of said input pulses, a blocking oscillator including an electron tube having a grid, a plate and a cathode, a coupling transformer regeneratively coupled between said plate and said grid having a plate winding and a grid winding, a resistor and a capacitor connected in parallel between one terminal of said grid winding of said coupling transformer and said grid for damping out spurious oscillations in said oscillator, a resistor connected in parallel with said grid winding of said coupling transformer, counting means including a second saturable core having two windings wound thereon and being composed of a substantially rectangular hysteresis loop material having high magnetic remanence, means connecting one terminal of said output winding through a first diode to one terminal of one of said windings on said second saturable core, means connecting the other terminal of said one winding through a capacitor to the terminal of said grid winding remote from said grid, the other winding on said second saturable transformer being connected from said one terminal of said one winding through a resistor to the other terminal of said output winding, the polarity and turns ratio of said two windings being such that the coercive current flow through said other winding induces a voltage in said one winding sufficient to cancel the voltage therein due to said uniform volt-second area output pulses, said first diode being poled in a direction to pass current during said resetting of said first core, said cathode being connected through a resistor to the other winding of said output winding, a source of bias voltage for maintaining said oscillator in its off state having a negative and a positive terminal, said positive terminal being connected to said other terminal of said output winding, said negative terminal being connected through a second diode to the terminal of said grid winding of said coupling transformer remote from said grid, said second diode being poled in a direction to pass current flowing away from said grid, said uniform volt-second area output pulse having sufficient energy to drive said second saturable core over a fixed increment of said hysteresis loop determined by the number of pulses to be counted per stage whereby after application of said number of pulses said second saturable core saturates and triggers said oscillator, and a third diode connected between said cathode and said other terminal of said one winding on said second saturable core, said third diode being poled to pass current to said cathode for resetting said second saturable core after triggering of said oscillator.

6. A blocking oscillator counter stage comprising an electron tube having at least a grid, a plate and a cathode, a transformer having a first saturable core composed of a substantially rectangular hysteresis loop material with high magnetic remanence, said transformer having a plate winding, a grid winding, a counting winding and an output winding wound thereon, means connecting said cathode to a common point, a resistor connecting one terminal of said grid winding to said grid, means connecting one terminal of said plate winding to said plate, a first source of potential having a positive and a negative terminal, means connecting the other terminal of said plate winding to said positive terminal of said first source of potential, said negative terminal of said first source being connected to said common point, an input winding to said stage wound on a second saturable core, a first diode connected between one terminal of said input winding and the other terminal of said grid winding, one terminal of said counting winding being connected to said other terminal of said grid winding, the other terminal of said counting winding being connected through a resistor to the other terminal of said input winding, said first diode being poled in the direction to pass current during resetting of said second core, a second diode connected across said first diode and said input winding, a second source of bias potential for maintaining said oscillator in its off state having a negative and a positive terminal, said negative terminal of said second source being connected to said other terminal of said input winding and said positive terminal of said second source being connected to said common point, means for applying pulses to be counted to said second core, and means for resetting said second core.

7. A blocking oscillator counter stage comprising an electron tube having a grid, a plate and a cathode, a first transformer having a saturable core composed of a substantially rectangular hysteresis loop material with high magnetic remanence, said first transformer having a plate winding, a grid winding, a counting winding and an output winding wound thereon, means connecting one terminal of said plate winding to said plate, means for connecting the other terminal of said plate winding to the positive terminal of a first source of direct current potential, a resistor connected between one terminal of said grid winding and said grid, said cathode being connected to a common point, means for connecting the negative terminal of said first source to said common point, a second saturable core transformer having an input and an output winding wound thereon, means for connecting a source of pulses to be counted to said input winding, means connecting one terminal of said output winding of said second transformer through a first diode to the other terminal of said grid winding, a resistor connected between the other terminal of said output winding of said second transformer and one terminal of said counting winding, means connecting the other terminal of said counting winding to said other terminal of said grid winding, a second diode connected from said other terminal of said output winding of said second transformer to said other terminal of said grid winding, said second diode being poled to pass current flowing away from said grid, means for connecting a second source of direct current potential for maintaining said oscillator in its off condition including means for connecting the positive terminal of said second source to said common point and the negative terminal of said second source to said other terminal of said output winding of said second transformer, said plate winding being poled to cause regeneration in said oscillator through coupling to said grid winding and to simultaneously reset said first transformer core upon triggering of said oscillator, said counting winding being poled to induce a voltage in said grid winding during counting in opposition to the voltage induced from said output winding of said second transformer to cancel the spurious effects of noise due to counting pulses in said grid circuit, said first diode being poled to conduct current during resetting of said second core, whereby said output winding of said second transformer on resetting of said second core transfers a uniform volt-second area pulse to said counting winding while said second core is reset, each of said uniform volt-second area pulses having sufficient energy to drive said first saturable core over a fixed increment of said hysteresis loop determined by the number of pulses to be counted per stage whereby after application of said number of pulses said first saturable core will saturate and trigger said oscillator.

8. A blocking oscillator counter stage comprising a pair of input terminals for connection to a source of input pulses to be counted, means connected across said input terminals for deriving across a pair of output terminals a uniform volt-second area output pulse from each of said input pulses, a blocking oscillator including an active element having at least an input electrode, an output electrode and a common electrode, said output electrode and input electrode having transformer windings regeneratively coupled therebetween, counting means including a winding on a saturable core connected between one of said output terminals and the input electrode circuit of said blocking oscillator, said core being composed of a substantially rectangular hysteresis loop material having high magnetic remanence, means connecting the other of said output terminals with the common electrode circuit of said blocking oscillator, said uniform volt-second area output pulse having sufficient energy to drive said saturable core over a fixed increment of said hysteresis loop determined by the number of pulses to be counted per stage, whereby after application of said number of pulses said saturable core will saturate and trigger said oscillator, and means for resetting said saturable core after triggering said oscillator.

9. A blocking oscillator counter stage comprising a pair of input terminals for connection to a source of input pulses to be counted, means connected across said input terminals for deriving across a pair of output terminals an output pulse from each of said input pulses wherein any fluctuations in volt-second areas present in the input pulses are reduced, a blocking oscillator including an active element having at least an input electrode, an output electrode and a common electrode, said output electrode and input electrode having transformer windings regeneratively coupled therebetween, counting means including a winding on a saturable core connected between one of said output terminals and the input electrode circuit of said blocking oscillator, said core being composed of a substantially rectangular hysteresis loop material having high magnetic remanence, means connecting the other of said output terminals with the common electrode circuit of said blocking oscillator, said output pulse having sufficient energy to drive said saturable core over a fixed increment of said hysteresis loop determined by the number of pulses to be counted per stage, whereby after application of said number of pulses said saturable core will saturate and trigger said oscillator, and means for resetting said saturable core after triggering said oscillator.

No references cited.